United States Patent [19]
DeHart

[11] Patent Number: 5,887,632
[45] Date of Patent: Mar. 30, 1999

[54] COIL WINDING FORM

[75] Inventor: Hobart DeHart, Austin, Ind.

[73] Assignee: Reliance Electric Industrial Company, Cleveland, Ohio

[21] Appl. No.: 891,166

[22] Filed: Jul. 10, 1997

[51] Int. Cl.[6] ....................................................... B21F 3/00
[52] U.S. Cl. ............................................................. 140/92.1
[58] Field of Search ............................................. 140/92.1

[56] References Cited

U.S. PATENT DOCUMENTS

| | | | |
|---|---|---|---|
| 3,872,897 | 3/1975 | Droll et al. | 140/92.1 |
| 3,958,611 | 5/1976 | Lesch et al. | 140/92.1 |
| 3,977,444 | 8/1976 | Lauer et al. | 140/92.1 |

Primary Examiner—Lowell A. Larson
Attorney, Agent, or Firm—John M. Miller; John J. Horn; William R. Walbrun

[57] ABSTRACT

A coil form for winding stator wire includes front and back coil forms which are designed to overcome the drawbacks of the known coil forms. The front coil form is adjustable between a first open position in which coils may be formed in a first series of sizes and a second closed position in which coils are formed in a second series of sizes. The adjustable front coil form allows tooling to be changed between even and odd winding form configurations without delays due to required set up time. The back coil winding form includes a tapered back surface which prevents coils from moving forward or unwinding before they are captured in a coil-receiving fork. This prevents coils from being received in an improper slot in the fork and allows the manufacture of a high quality product.

16 Claims, 6 Drawing Sheets

COIL WINDING FORM

Background of the Invention

The present invention relates to the field of coil winding and, more particularly, to a coil winding form or holder on which wire coils may be wound in different lengths.

Various winding apparatus are known which are employed for winding sets of coils having different lengths and different pitches. A winding apparatus for winding these coils generally includes a rotatable coil winding flyer for winding coils of wire from a spool around a stepped coil holder or coil form. The coil holder is used to form coils of different lengths by winding on the different steps on the holder. As the wire coils are formed on the coil holder, the different length coils are moved from the coil holder onto a fork. The fork having coils of stator wire held between its teeth is inserted into an electric motor to introduce the stator wire to the motor.

In the winding of concentric stator wire coils it is necessary to wind the desired number of turns on each of the coil form steps and to move the flyer with respect to the coil form to space the coils or to move from one step to the next. A control means generally controls the winding of the coils determining the number and pitch of the coils to be wound on each of the levels of the coil form. An example of a coil winding apparatus and associated control means is shown in U.S. Pat. No. 4,046,175.

The differing number and size of the coils required for different stators, dictate the use of more than one coil form to achieve all the necessary sizes. However, switching between different coil forms is time consuming, delaying work, and reducing cell throughput. In order to reduce switching time, a plurality of coil forms can be mounted on a turret which is then rotated for winding on the different forms as shown in U.S. Pat. No. 3,851,682. However, a simpler and more compact solution to the need for multiple coil forms would be desirable.

As the coils are being wound on the coil form by rotation of the coil winding flyer around the coil form, they are dropped onto a hollow cylindrical fork with longitudinal slots. The fork is positioned to receive each of the coils in a particular set of slots. However, as the coils slide off the coil form onto the fork slack may occur in some of the coils which allows the coils to drop into an improper slot, or skip a tooth in the fork. The coils which have been collected on the fork are forced into the stator slots of a motor by the fork whose teeth fit into the stator slots in the motor. The presence of coils which have dropped into an improper slot in the fork and thus, end up in a wrong slot in the stator decreases the overall efficiency of the motor.

SUMMARY OF THE INVENTION

The present invention addresses the problems of the prior art coil forms by providing a coil form having an adjustable size and a back coil form with a tapered surface which assists the coils in entering the proper fork slots.

According to one aspect of the present invention, a coil winding form includes a base, a front coil winding form mounted on the base and having a front surface with a plurality of steps for winding coils of different lengths, and a back coil winding form mounted on the base and spaced from the front form. The back form has a back surface furthest from the front form with a tapered non-stepped shape and side surfaces adjacent the tapered back surface with a plurality of steps corresponding to the steps of the front form. The tapered back surface assures that the coils wound on the coil winding form are received in a proper tooling slot of a coil-receiving fork.

In accordance with a more limited aspect of the invention, the plurality of steps of the front form are arcuate in shape, and the plurality of steps on the side surfaces of the back form are arcuate in shape and aligned with the arcuate-shaped steps of the front form to provide a plurality of coil winding levels for winding coils of different lengths.

According to a further aspect of the invention, a coil winding form includes a front coil winding form including two half sections and a plurality of steps formed on the two half sections for winding coils of different lengths around both of the half sections, a back coil winding form including a plurality of steps corresponding to the steps of the front form for winding the coils of different lengths, and adjustment means for moving the two half sections of the front form between a closed position and an opened position allowing winding of coils in a number of lengths which is twice the number of the plurality of steps formed on the front form.

According to a more limited aspect of the invention, the adjustment means includes a movable cam and cam surfaces provided on each of the two half sections of the front form.

According to another more limited aspect of the invention, the two half sections are pivotally mounted on a base and longitudinal movement of the cam causes the two half sections to pivot between the closed and opened positions.

The present invention overcomes the problems of the prior art including switching time needed to switch between different size coil forms and skipping which occurs when coils are improperly received on a coil-receiving fork.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
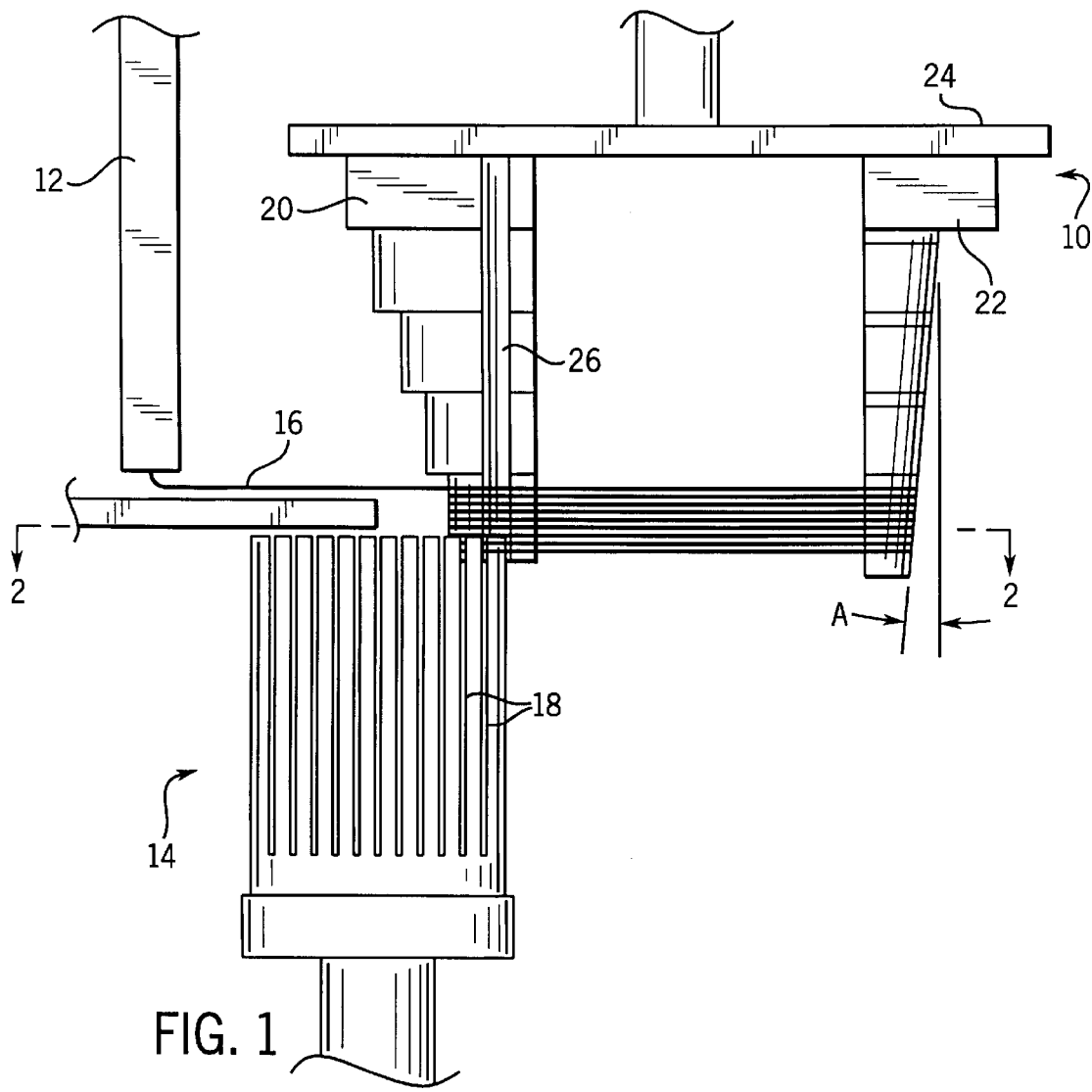
FIG. 1 is a side view of a coil winding apparatus according to the present invention.

Referring now to the drawings wherein the showings are for the purposes of illustrating the preferred embodiment of the invention only and not for purposes of limiting same, FIG. 1 shows a coil winding apparatus including a coil form 10, a flyer 12 for winding coils around the coil form, and a cylindrical slotted fork 14 for receiving the wound coils from the coil form.

The coil form 10 includes a front coil form 20 and a back coil form 22 each provided with a series of steps forming different levels for winding coils of different lengths. In FIG. 1, the wire 16 is being wound around a first step or level of the coil form 10 to form small size coils. The front and back forms 20, 22 are mounted on a coil form base 24. As shown, in the cross sectional view of FIG. 2, each step of the front coil form 20 has a substantially trapezoidal cross-sectional shape. The steps of the back coil form 22 have either a substantially rectangular or a hemispherical cross section. The exterior corners of the coil form steps are rounded to form a coil without any abrupt bends or kinks.

The flyer 12 is illustrated as a vertical bar which rotates around the coil form 10, into and out of the paper as shown in FIG. 1, to wind the stator wire 16 on the coil form. Other flyer configurations such as a fork-shaped flyer may also be used. The flyer 12 is movable in an axial direction with respect to the coil form 10 so that the coils can be wound by the flyer on different steps of the coil form.

The cylindrical fork 14 is a hollow cylindrical fork having a plurality of teeth 18 and slots formed between the teeth. The number and spacing of the teeth 18 corresponds to the stator slots in an electric motor. The fork 14 is also movable in an axial direction with respect to the coil form 10 to receive coils which have been wound on different steps of the coil form 10.

The teeth 18 of the fork 14 are received in a corresponding arch-shaped slot 26 in the front coil form 20. This arch-shaped slot 26 allows the teeth 18 of the fork 14 to move up into the coil form to receive the coils from a particular level or step at which the coils are being formed.

Figure 3:
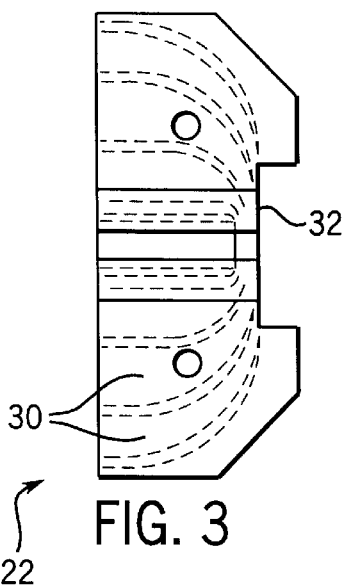
FIG. 3 is a top view of a tapered back form according to the invention.
Figure 4:
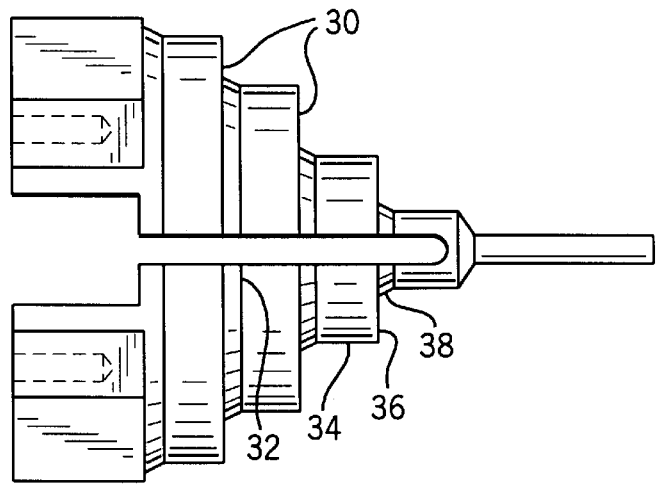
FIG. 4 is a back view of the tapered back form of FIG. 3.
Figure 5:
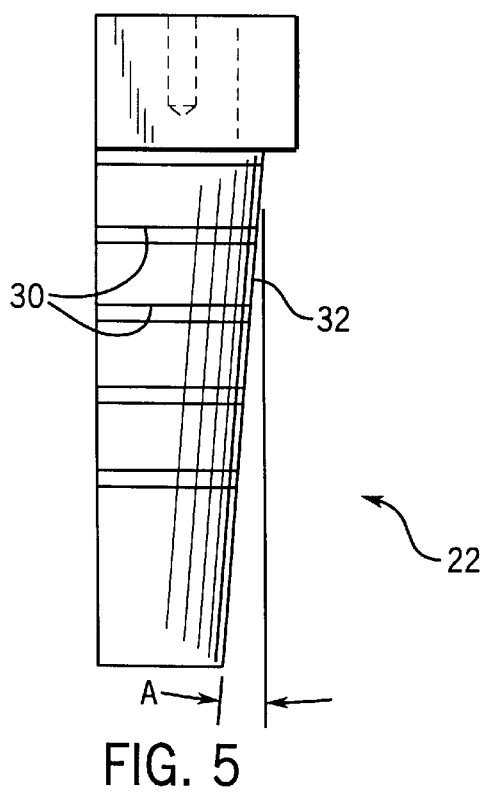
FIG. 5 is a side view of the tapered back form of FIG. 3.

FIGS. 3–5 illustrate a back coil form 22 according to the present invention including a plurality of steps 30 and a tapered back surface 32. As shown in the top view of FIG. 3, the steps 30 shown in hidden lines are formed on the two opposite side surfaces of the back form 22. The steps 30 each have a rise 34, a run 36, and an angled corner surface 38 between the rise and the run, shown most clearly in FIG. 4. The run 36 of each of the steps 30 is tapered or reduced in size toward the back tapered surface 32 such that the steps disappear at the tapered back surface of the back coil form. The tapered back surface 32 is formed at an angle A with respect to a line perpendicular to the steps. The angle A is between approximately 1° and approximately 10°, preferably between 3° and 5°.

Figure 2:
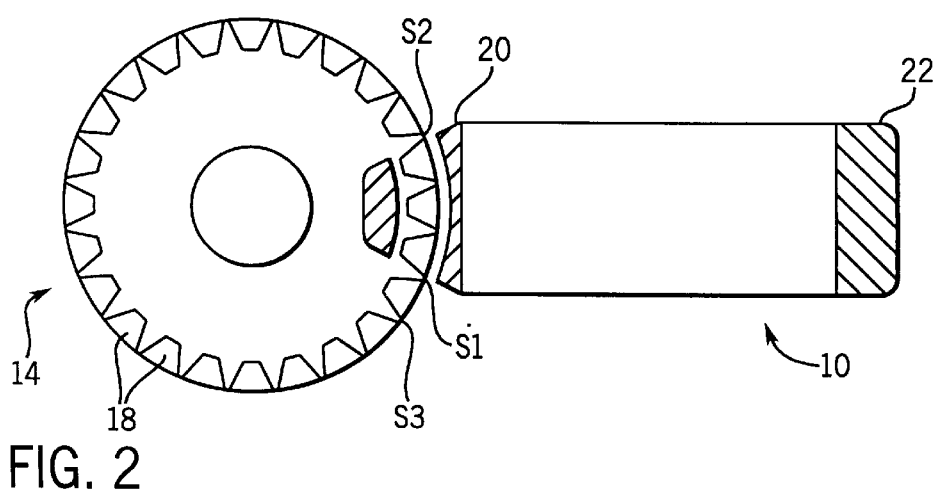
FIG. 2 is a top cross-sectional view taken along line 2—2 of FIG. 1.
Figure 6:
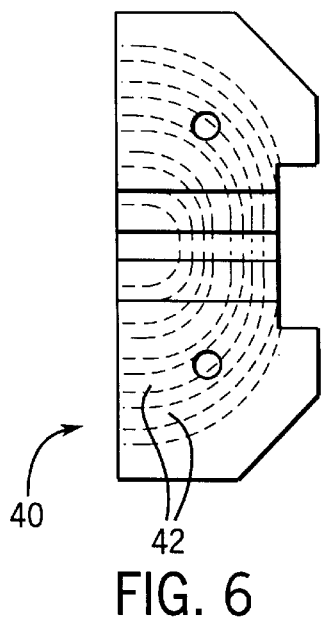
FIG. 6 is a top view of an untapered back form.
Figure 7:
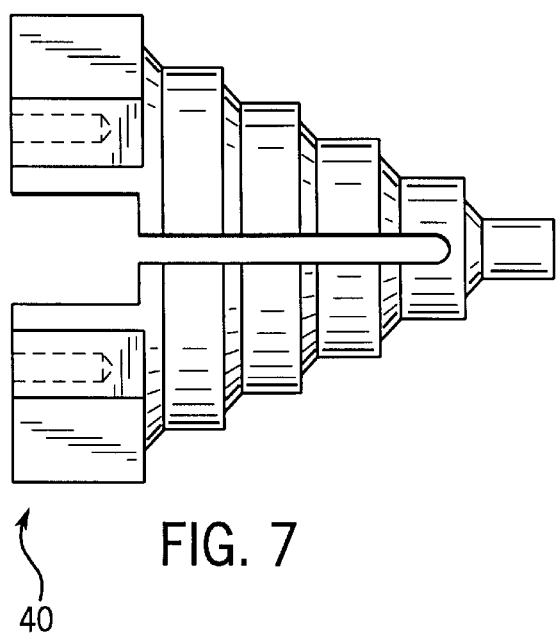
FIG. 7 is a back view of the untapered back form of FIG. 6.
Figure 8:
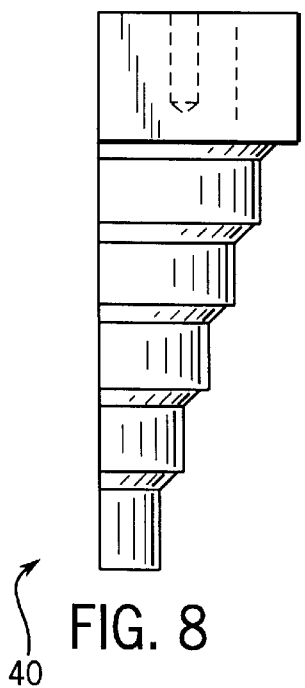
FIG. 8 is a side view of the untapered back form of FIG. 6.

A back coil form 40 without a tapered surface is illustrated in FIGS. 6–8 for purposes of comparison. The back coil form 40 includes steps 42 which are hemispherically-shaped as shown in the top view of FIG. 6. As shown in the side view of FIG. 8, the steps 42 extend across the back surface of the coil form. With the hemispherical steps 42 of the untapered back coil form, a problem occurs during use in that the coils formed on one of the steps 42 may drop off the step of the back coil form 40 before the coil has been received in the correct slot in the coil-receiving fork 14. If this happens the coil has excessive slack and may fall into an improper slot in the cylindrical coil-receiving fork 14. As shown in FIG. 2, the coil form 10 and the fork 14 are arranged so that the coils will drop into a first slot S1 and a second slot 82 between the teeth of the fork. However, if a coil falls off the back step when using a coil form without a tapered back surface, the coil may drop into an improper slot such as the third slot S3.

The tapered back surface 32 of the back coil form 22 of FIGS. 3–5 addresses this problem by keeping some amount of tension on the coils even if they begin to slip off one of the steps 30 on the sides of the back coil form. This tapered back version of the back coil form 22 greatly increases the accuracy with which the coils are positioned on the cylindrical fork 14 by preventing the coils from moving forward or unwinding before they are received in the fork and thus, increases the efficiency of the motors in which the finished stator wire coils are used. This new design for a back coil form 22 allows hands-off operation because operator verification of the position of the wire in the proper tooling slot is not required.

Figure 9:
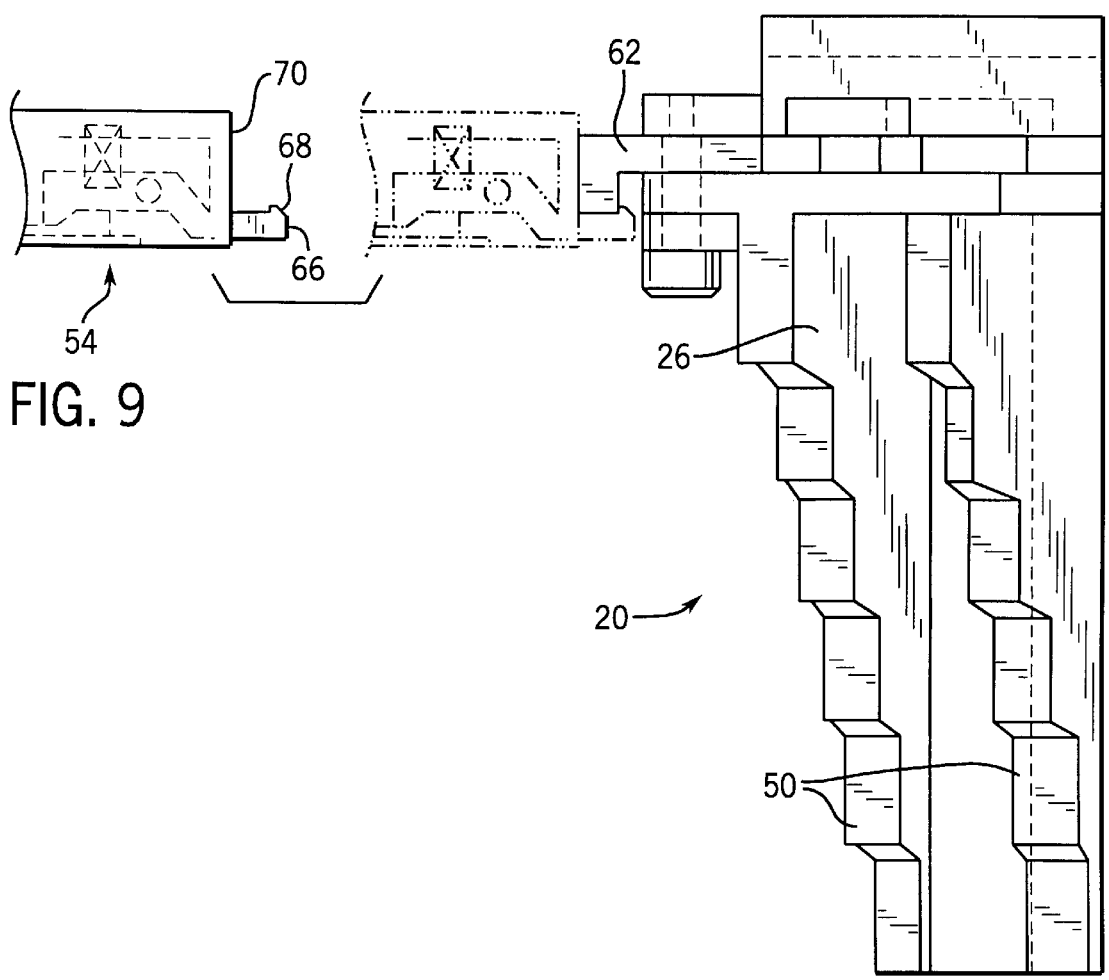
FIG. 9 is a side view of an adjustable front form.

FIG. 9 is a side view of an adjustable front coil form 20 according to a preferred embodiment of the invention. The front form 20 includes a plurality of steps 50 for winding coils of different lengths and an arch-shaped slot 26 for receiving a portion of the cylindrical fork 14. A front wall of each of the steps 50 is particularly dimensioned to deposit a coil around a predetermined number of teeth 18 of the cylindrical coil-receiving fork 14 illustrated in FIG. 1. However, to achieve the necessary number of different coil sizes with a non-adjustable coil form, one coil form is provided which deposits coils around even numbers of teeth 18 on the fork 14 while a separate coil form is used to deposit coils around an odd number of teeth of the cylindrical fork 14.

Figure 10:
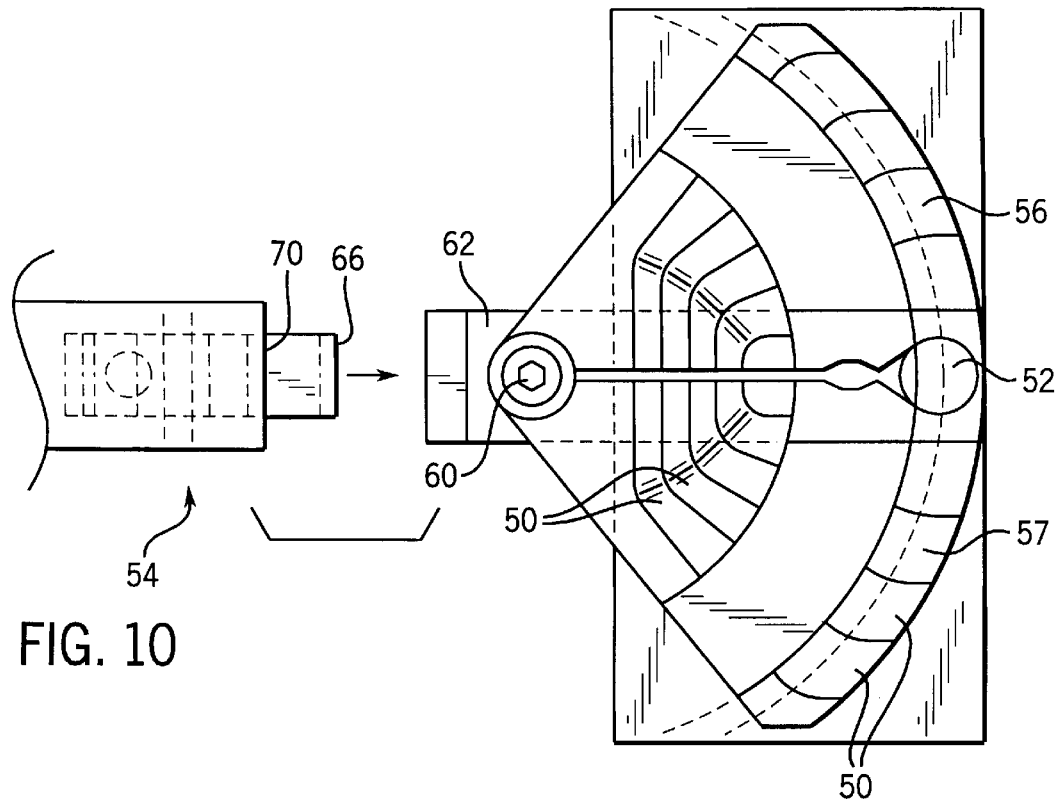
FIG. 10 is a bottom view of the adjustable front form of FIG. 9 in a close position.
Figure 11:
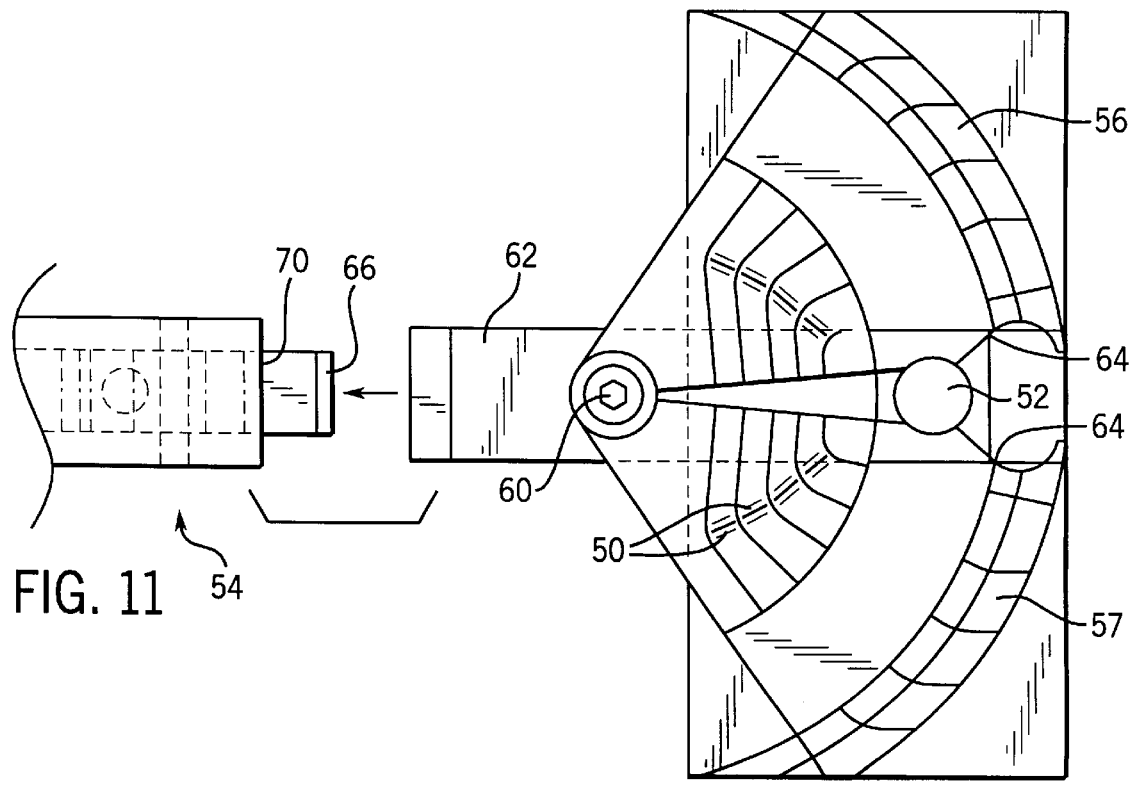
FIG. 11 is a bottom view of the adjustable front form of FIG. 9 in an open position.

The front coil form 20 as shown in FIG. 9 can be adjusted from an even coil winding form as shown in FIG. 10 to an odd coil winding form as shown in FIG. 11 by an adjustment mechanism including a cylindrical cam member 52 and an automatic cam positioner 54. The front coil form 20 according to the invention can replace two non-adjustable odd and even coil forms and is easily adjustable by the adjustment mechanism.

The front coil form 20 is formed in two wedge-shaped halves 56, 57 when viewed from the bottom views of FIGS. 10 and 11. The two halves 56, 57 which are each independently pivotable on a pivot 60 which allows the two halves to pivot from the closed position illustrated in FIG. 10 to the open position shown in FIG. 11. The cylindrical cam member 52 is mounted on a slide 62 which is used to move the cam member from one position to another. The cam member 52 engages cam surfaces 64 on the inside edges of the two halves 56, 58 of the form. The cam surfaces 64 each include a large arc-shaped portion and a smaller arc-shaped portion for receiving the cam. To move the two halves 56, 58 from the closed position of FIG. 10 to the open position or FIG. 11, the slide is moved to the left in the FIGURES, causing the cam member 52 to engage the cam surfaces 64 and press the two halves apart. To move to the closed position, the slide 62 is moved to the right in the FIGURES.

According to one preferred embodiment of the invention, the slide 62 is moved by the automatic cam positioner 54 which includes a spring loaded pivoting hook 66. As the positioner 54 is moved toward the slide 62 an angled surface 68 of the hook 66 engages the slide causing the hook to pivot and snap onto the slide. The slide is then pulled to the opened position by the hook. The slide can also be pushed to the closed position by an abutment surface 70 of the cam positioner 54 which engages an end of the slide. Although the slide 62 has been described and illustrated with its automatic positioner 54, the slide may also be move manually.

Figure 12:
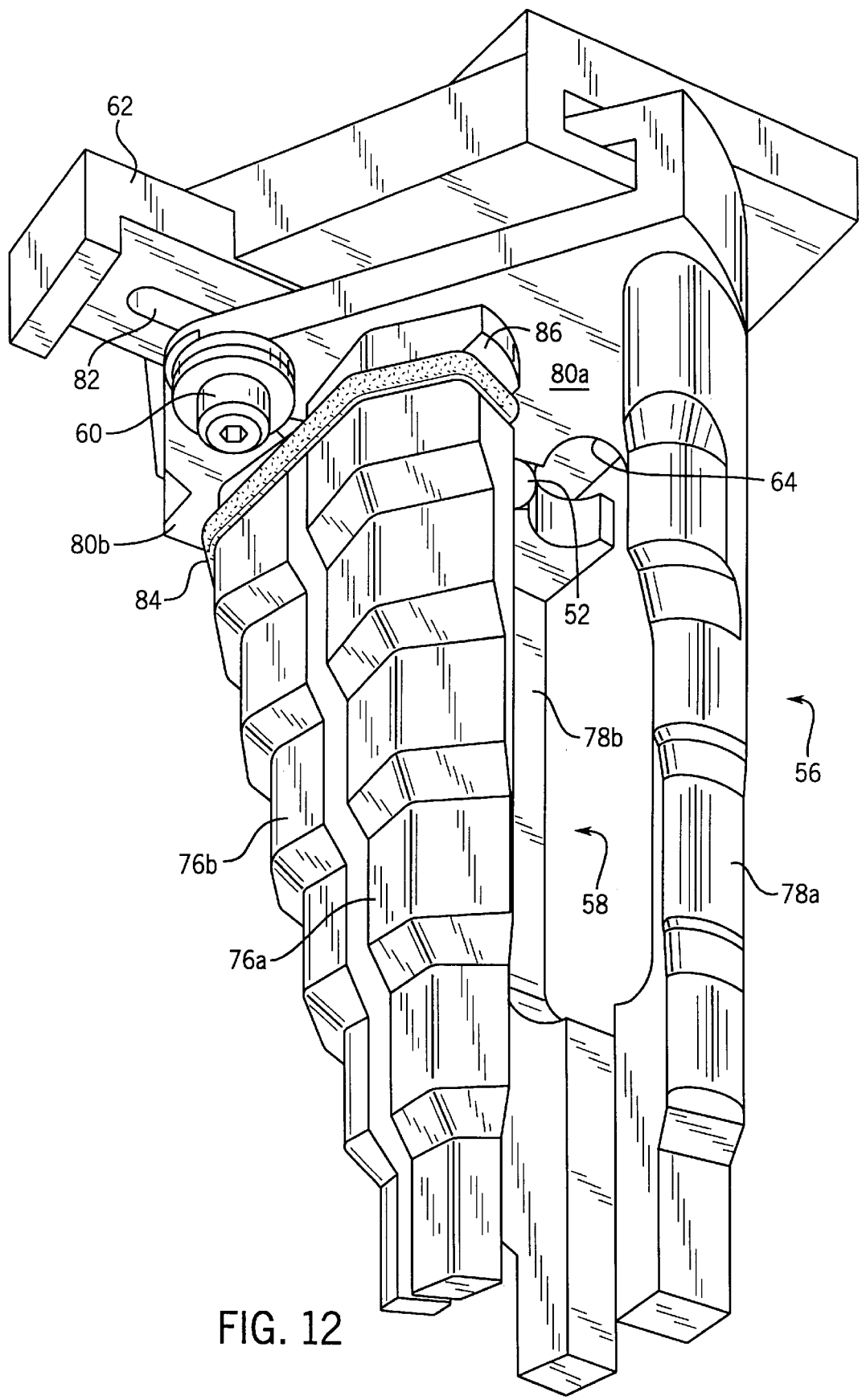
FIG. 12 is a perspective view of the adjustable front form of FIG. 9 in the open position.

FIG. 12 is a perspective view of the front coil winding form 20 according to the present invention in the open position. As shown in the FIGURE, the first half 56 and the second half 58 each include two stepped members, namely, a front stepped member 76a, 76b and a back stepped member 78a, 78b with the fork-receiving slot 26 therebetween. The front and back stepped members 76a, 78a are mounted on the wedge-shaped plate 80a. The second half 58 of the front form also includes front and back stepped members 76b, 78b mounted on a wedge-shaped plate 80b. The two plates 80a, 80b are pivotally mounted on the bolt 60 for movement between the opened and closed positions. The slide 62 moves the cylindrical cam member 52 against the cam surfaces 64 and includes a slot 82 which allows the slide to move longitudinally with respect to the bolt 60.

The front coil winding form 20 also includes an elastic member 84 which is received around the front stepped members 76a and 76b in grooves 86. The elastic member 84 biases the two halves 56, 58 of the front form towards the closed position and maintains the cam surfaces 64 in continuous contact with the cylindrical cam member 52.

The present invention provides an improvement over the prior art by allowing a single front coil winding form member 20 to be used as either an odd or an even coil winding form. Although the present invention has been described and illustrated as including two positions (i.e., opened and closed), it should be understood that additional cam positions can be provided to achieve additional coil winding form sizes. For additional adjustability, the back coil winding form 22 may also be provided with an adjustment mechanism similar to that used for the front form.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A coil winding form comprising:
   a base;
   a front coil winding form mounted on the base and having a front surface with a plurality of steps for winding coils of differing lengths; and
   a back coil winding form mounted on the base and spaced from the front form, the back form having a back surface furthest from the front form with a tapered non-stepped shape and side surfaces adjacent the tapered back surface with a plurality of steps corresponding to the steps of the front form, the tapered back surface assuring that the coils wound on the coil winding form are received in a proper tooling slot of a coil-receiving fork.

2. The coil winding form according to claim 1, wherein the plurality of steps of the front form are arcuate-shaped steps and the plurality of steps on the side surfaces of the back form are arcuate-shaped steps aligned with the arcuate-shaped steps of the front form to provide a plurality of coil winding levels for winding coils of differing lengths.

3. The coil winding form according to claim 1, wherein the plurality of steps of the back form each have a rise and a run, the run of each of the steps decreasing in a direction approaching the back surface.

4. The coil winding form according to claim 1, wherein the plurality of steps of the front form and the back form have an angled surface formed at an interior corner of each of the steps.

5. The coil winding form according to claim 1, wherein the front form includes an enlargement mechanism for automatically and discretely changing a size of the front form to form coils of differing sizes.

6. The coil winding form according to claim 5, wherein the enlargement mechanism includes a cam and an automatic cam actuator.

7. A coil winding form comprising:
   a front coil winding form including two half sections and a plurality of steps formed on the two half sections for winding coils of different lengths around both of the half sections;
   a back coil winding form including a plurality of steps corresponding to the steps of the front form for winding the coils of different lengths around the front and back forms; and
   adjustment means for moving the two half sections of the front form between a closed position and an opened position allowing winding of coils in a number of lengths which is two times a number of the plurality of steps formed in the front form, the adjustment means including a movable cam and cam surfaces provided on each of the two half sections of the front form.

8. The coil winding form according to claim 7, wherein the two half sections are pivotally mounted on a base and longitudinal movement of the cam causes the two half sections to pivot between the closed and opened positions.

9. The coil winding form according to claim 7, wherein the cam is a cylindrical cam member and the cam surfaces on the two half sections include two semi-circular seats.

10. The coil winding form according to claim 9, wherein the cylindrical member is mounted on a sliding cam positioner.

11. The coil winding form according to claim 10, wherein the sliding cam positioner is moved between the opened position or the closed position by an automatic cam actuator.

12. The coil winding form according to claim 7, wherein the adjustment means is automatically adjustable by an automatic cam actuator.

13. A coil winding form comprising:
   a base;
   a front coil winding form mounted on the base and including two half sections for adjusting a size of the front form and a plurality of steps formed on the two half sections for winding coils of different lengths around both of the half sections; and
   a back coil winding form mounted on the base and spaced from the front form, the back form having a back surface furthest from the front form with a tapered, non-stepped shape for winding the coils of different lengths.

14. The coil winding form according to claim 13, wherein the back form includes side surfaces adjacent the tapered back surface and steps formed on the side surfaces which decrease in size toward the tapered back surface.

15. The coil winding form according to claim 13, wherein the two half sections of the front form allow adjustment of the front form between a closed position in which coils are formed in a first series of sizes and an opened position in which coils are formed in a second series of sizes.

16. The coil winding form according to claim 15, wherein the front form includes a cam for adjusting the front form between the opened and closed positions and an automatic cam actuator for operating the cam.

* * * * *